US008370369B2

(12) United States Patent
Veres et al.

(10) Patent No.: US 8,370,369 B2
(45) Date of Patent: Feb. 5, 2013

(54) METHOD AND SYSTEM FOR NETWORK FAULT MANAGEMENT

(75) Inventors: András Veres, Budapest (HU); Peter Vaderna, Budapest (HU); Ferenc Kubinszky, Szentendre (HU); Péter Benkő, Budapest (HU); Gergely Szabó, Budapest (HU); Szabolcs Malomsoky, Szentendre (HU); Tamas Borsos, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 212 days.

(21) Appl. No.: 12/988,739

(22) PCT Filed: Apr. 21, 2008

(86) PCT No.: PCT/EP2008/054819
§ 371 (c)(1),
(2), (4) Date: Oct. 20, 2010

(87) PCT Pub. No.: WO2009/129841
PCT Pub. Date: Oct. 29, 2009

(65) Prior Publication Data
US 2011/0078163 A1    Mar. 31, 2011

(51) Int. Cl.
G06F 7/00    (2006.01)
G06F 17/00    (2006.01)
G06F 17/30    (2006.01)
G06F 15/173    (2006.01)

(52) U.S. Cl. .......... 707/754; 707/688; 709/223
(58) Field of Classification Search ........ 707/688, 707/754; 709/223
See application file for complete search history.

(56) References Cited

U.S. PATENT DOCUMENTS

| 4,905,171 | A | * | 2/1990 | Kiel et al. | 702/186 |
|---|---|---|---|---|---|
| 5,255,356 | A | * | 10/1993 | Michelman et al. | 715/217 |
| 5,615,323 | A | * | 3/1997 | Engel et al. | 345/440 |
| 5,835,721 | A | * | 11/1998 | Donahue et al. | 709/224 |
| 6,286,035 | B1 | * | 9/2001 | Gillis et al. | 709/206 |
| 6,516,348 | B1 | * | 2/2003 | MacFarlane et al. | 709/224 |
| 6,578,077 | B1 | * | 6/2003 | Rakoshitz et al. | 709/224 |
| 6,816,903 | B1 | * | 11/2004 | Rakoshitz et al. | 709/226 |
| 6,839,070 | B2 | * | 1/2005 | Meandzija et al. | 715/736 |
| 2004/0088314 | A1 | * | 5/2004 | Simes | 707/102 |
| 2004/0163039 | A1 | * | 8/2004 | Gorman | 715/505 |
| 2005/0222811 | A1 | | 10/2005 | Jakobson et al. | |
| 2006/0100974 | A1 | * | 5/2006 | Dieberger et al. | 707/1 |

FOREIGN PATENT DOCUMENTS

| WO | WO 2006/102915 A | 10/2006 |
|---|---|---|
| WO | WO 2007/063426 A | 6/2007 |

\* cited by examiner

*Primary Examiner* — Charles Lu (57) ABSTRACT

Methods of processing record data are presented, together with a Central Management Node for processing record data, and Management Subsystem DataBases for providing a record data set and matching record data. Triggered by service related network fault event, a key table comprising at least one key type is determined, based on a focus target record and related to the network fault event is determined, which key table is used in the step matching the at least one key with record data sets in determined Management Subsystem DataBases. Matched results are merged, whereafter a service performance indicator may be determined, based on which a multi-layer water flow analysis of subsystem specific performance related indicators can be obtained. This analysis may be successfully used to reveal the location of the service related network fault.

9 Claims, 5 Drawing Sheets

METHOD AND SYSTEM FOR NETWORK FAULT MANAGEMENT

TECHNICAL FIELD

The present invention relates in general to methods and apparatuses for network fault management and in particular to methods and apparatuses for progressive correlation enabling localization of network faults.

BACKGROUND

Known fault localization methods aim at finding the correlation between fault carrying events and a network fault. This is usually a difficult task due to the relatively large amount of events caused by a network fault.

An important limitation of such methods is that they limit the scope of correlation to fault carrying events. In reality, in a complex communication system, such as mobile systems, it may not be necessarily sufficient to process fault events alone to succeed in fault localization, because fault events themselves may be an effect of a real fault and may even occur as symptoms of the real fault. These symptoms may be localized far away from the actual location of the fault.

For example, subsystem I has a retransmit timer, which can be set so that a service II experience a large access delay because of that its state machine delay requirements are often exceeded, which now is due to the interaction between the retransmit timer of subsystem I and its own state machine. In this example, service II accordingly reports a fault, whereas subsystem A does not, although the problem is located in subsystem I.

Moreover, common communication systems have in fact limited the set of possible fault events, for the reason that it may be difficult to represent all possible problem sources. For example, routers typically report lost packets. However, they do not report packet reordering. Packet reordering as such is not considered to be an important performance fault in transport networks. Nevertheless, there are services that are sensitive to high levels of reordering of packets. This type of fault events, packet reordering in routers, is therefore not detectable by fault management systems that are purely based on fault reporting from the network.

It is known from existing techniques to analyze the dependence on different network subsystems that are fault event or alarm based. However, these techniques seem to search for dependencies between the fault event(s) and the problem causing the fault events, within one or more different subsystems. Dependencies between for instance an alarm in a certain subsystem and the cause of the problem, if the cause resides in a different subsystem, are thus not considered.

Some techniques correlate events within a subsystem and that are capable of finding non-trivial dependences between network faults that may be hidden from an ordinary Operations, Administrations and Maintenance (OAM) system. However these are not applicable to system levels, for the reason that they fail to relate the various services to different subsystems.

From US-2003018228-A1 it is known a graph-based dependence mapping technique, which describes fixed dependences and which is therefore usually not applicable since this assumption is generally not feasible.

There is still a need to provide a generally applicable solution to the problem of localizing faults within networks, comprising different subsystems in a reliable way.

SUMMARY

An object of the present invention is to provide an improved fault localization within a network.

According to an aspect, there is provided a method of processing record data for enabling localization of a network fault associated with a service, where the method comprises the steps of obtaining information related to a service related network fault event, determining a focus target record, based on the information related to the service related network fault event, and obtaining record data set comprising at least one key type, related to a database, based on the focus target record. The method also comprises selecting at least one peripheral database and determining a key table comprising at least one key type, based on the obtained record data set, obtaining matched record data based on the key table, from the selected at least one peripheral database, and merging matched record data with the obtained record data set such that a data record information set comprising the matched database records and the determined at least one record set.

According to another aspect, there is provided a Central Management Node for processing record data for enabling localization of a network fault associated with a service, wherein the Central Management Node comprises means to obtain information related to the service related network fault event, means to determine a focus target record, based on the information related to the service related network fault event. The Central Management Node also comprises means to obtain record data set, based on the focus target record, means to select at least one peripheral database and to determine a key table comprising at least one key type, based on the obtained record data set, means to obtain matched record data based on the key table, from the selected at least one peripheral database, as well as means to merge matched record data with the obtained record data set.

According to another aspect, there is provided a method of a providing record data set for enabling localization of a network fault associated with a service, wherein the method comprises extracting record data related to a focus target record related the network fault event, and communicating extracted record data set comprising at least one key type.

According to yet another aspect, there is provided a Management Subsystem Database for providing a record data set for enabling localization of a network fault associated with a service, wherein the database comprises means to obtain events from network elements, in order to store event records with sets of four data type fields, means to extract record data related to a focus target record related to the network fault event, and means to communicate the extracted record data set.

According to yet another aspect, there is provided a method of matching record data for enabling localization of a network fault associated with a service, wherein the method comprises obtaining a key table comprising at least one key type related to a record data set, matching the at least one key type of the key table with a database record set, attaching matched record data to the key table, and communicating the key table and attached matched record data, such that record data information comprising the key table and the matched record data, is provided.

According to still yet another aspect, there is provided a Management Subsystem Database for matching record data for enabling localization of a network fault associated with a service, wherein the database comprises means to obtain a key table comprising at least one key type related to a record data set, means to match the at least one key type of the key table with a database record set. Management Subsystem Database for matching record data also comprises means to attach matched record data to the key table, and means to communicate the key table and attached matched record data, such that record data information comprising the key table and the matched record data, is provided.

According to still yet another aspect, there is provided a method for enabling localization of a network fault associated with a service, wherein the method comprises obtaining information related to a service related network fault event, determining a focus target record, based on the information related to the service related network fault event, extracting record data related to a focus target record related the network fault event, selecting at least one peripheral database and determining a key table comprising at least one key type, based on the record data set, matching the at least one key type of the key table with a database record set, attaching matched record data to the key table, and merging matched record data with the obtained record data set, such that a data record information set comprising the matched database records and the determined at least one record set, is provided.

According to still yet another aspect, there is provided a Network Fault Management System for providing at least a data record information set for enabling localization of a network fault associated with a service. The system comprises a Central Management Node for processing record data for enabling localization of a network fault associated with a service, comprising means to obtain information related to the service related network fault event, means to determine a focus target record, based on the information related to the service related network fault event, means to obtain record data set, based on the focus target record, means to select at least one peripheral database and to determine a key table comprising at least one key type, based on the obtained record data set, means to obtain matched record data based on the key table, from the selected at least one peripheral database, and means to merge matched record data with the obtained record data set. The Network Fault Management System also comprises a Management Subsystem Database for providing a record data set for enabling localization of a network fault associated with a service, wherein the database comprises means to obtain events from network elements, in order to store event records with sets of four data type fields, means to extract record data related to a focus target record related to the network fault event, and means to communicate the extracted record data set providing a record data set. In addition the Network Fault Management System also comprises at least one Management Subsystem Database for matching record data for enabling localization of a network fault associated with a service, wherein the said database comprises means to obtain a key table comprising at least one key type related to a record data set, means to match the at least one key type of the key table with a database record set, means to attach matched record data to the key table, and means to communicate the key table and attached matched record data, wherein the Central Management Node interfaces with the Management Subsystem DataBase for providing a record data set and the at least one Management Subsystem DataBase for matching record data.

Some relative advantages of presented aspects are:

A valid end-to-end performance survey comprising information, with which quality the services may reach the end-users, may be provided.

Previously hidden problems that did not trigger an alarm may be identified and taken into consideration.

Fast localization of faults may is enabled, in the case the dependences are complex.

The application of self-tuning methods is enabled due to presentation of service and network attributes related to problematic flows, in addition to the presentation of fault localization Although the processing according to some embodiments is based on detailed event records, due to the progressive method, the amount of management traffic should be manageable by adjusting the size of the key table. The inherently exponential complexity of a search may here be reduced to linear complexity.

It should be emphasized that the term "comprises/comprising" when being used in the specification is taken to specify the presence of the stated features, integers, steps or components but does not preclude the presence or addition of one or more other features, integers, steps or components or groups thereof.

BRIEF DESCRIPTION OF THE DRAWINGS

In order to explain the invention and the advantages and features thereof in more detail, embodiments of the invention will be described below, references being made to the accompanying drawing, in which.

DETAILED DESCRIPTION

Starting with a brief description of at least some embodiments of the present invention.

Following at least some embodiments of the present invention correlation of normal system events with fault carrying events belonging to a certain service instance is enabled as an early step of fault localization such that network faults can be traced to parts of the communication network that are not yet signalling faults. These parts may nevertheless comprise an important contributor to or source of network level fault event conditions.

The method according to at least some embodiments may start by defining a specific focus, which may relate to a certain service under observation. A progressive search may be conducted for subsystem databases representing different layers and technologies. Information about how these layers or technologies have treated the service is searched.

During this search, different layers of network protocols can be traced where the layers at least have some connection to the focus under observation. The progressive method may in a step-wise manner select, query and aggregate data in order to decide upon which network domain to query further by doing identity mappings in order to find records on different protocol layers in a multitude of databases. The mapping logic may be based on the service under observation.

The events may be collected from a distributed network event database representing different subsystems or protocol layers of the communication network. Performance data for specific services are distributed in subsystem databases and they are not readily accessible for correlation.

One reason may be that data can be aggregated on different levels, that is per cell, per event, per service, per area etc. Another reason may be that data can have different local IDs, for example, UTRAN uses International Mobile Subscriber Identity (IMSI), while Internet Protocol (IP) Core Network (CN) uses IP addresses.

The method according to at least some embodiments of the present invention may provide a solution to the level diversity. A record data information set that represents each service instance and its performance, identity and location attributes may be represented by a row in a database. This is irrespective of from what part of the system or from what protocol layer the attributes originate, and also regardless of whether said attributes are based on counters or events.

The resulting database may have a structure with segmented rows according to the different subsystems from which the information is extracted.

Based on the resulting record data set end-to-end service performance indicators may be introduced, which indicators typically cover the end-to-end treatment of services. This may be performed by applying a service performance model that processes the record data set.

Moreover, service instant specific performance scores may thus be calculated as well as an overall performance end-score for the service.

At least some embodiments of the present invention in addition may comprise a step of localizing the network fault based on a so-called multi-layer water flow analysis of the determined end-scores. The analysis may progressively benchmark the treatment of services given predefined criteria. The most likely contributor to performance problems, from the largest drop in performance scores, may be presented revealing the localization of the network fault.

Figure 1:
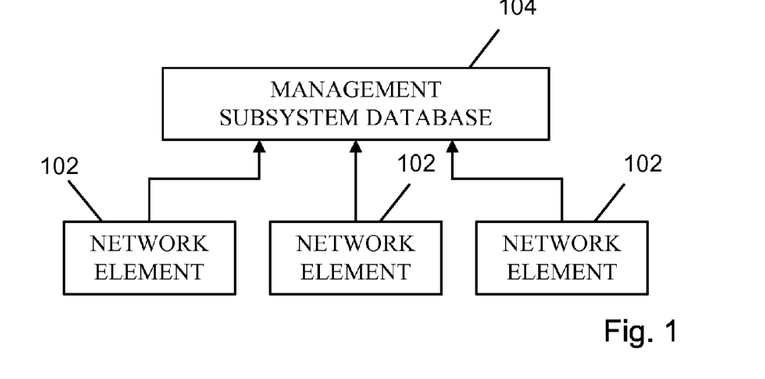
FIGS. 1 and 2 are block diagrams illustrating relations between entities related to of a network system.
Figures 2, 3:
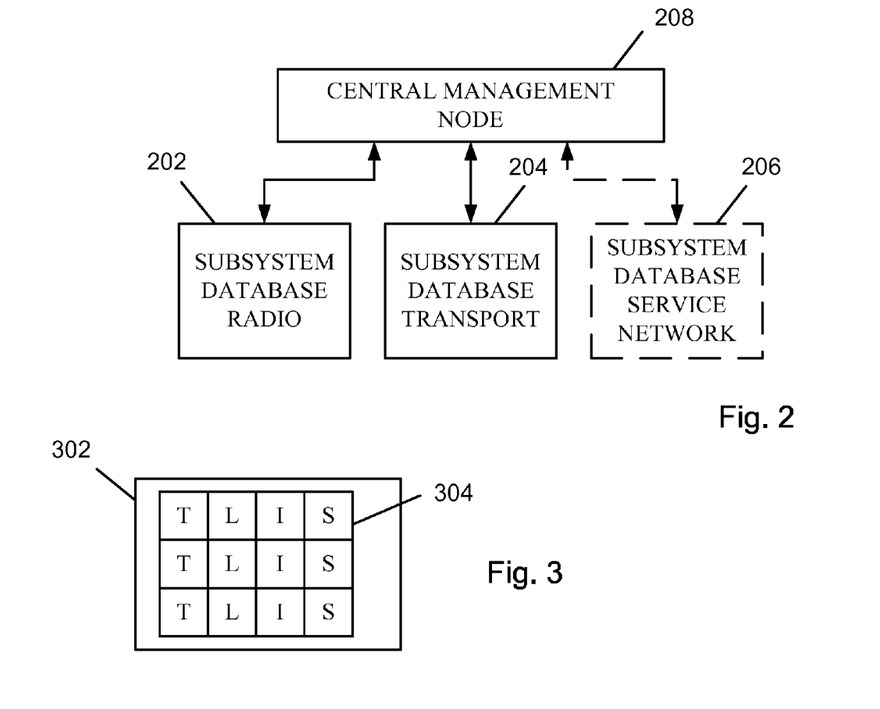
FIG. 3 illustrates one embodiment of a segmented database architecture.

In the following a more detailed description of at least some embodiments of the present invention is presented. FIG. 1 to which reference is made illustrates that data from Network elements 102 can be collected in a Management Subsystem DataBase 104. Reference is also made to FIG. 2 illustrating a system comprising three Management Subsystem DataBases 202, 204, 206 connected to a Central Management Node 208.

Network comprising network elements 102 usually create large amount of performance information continuously. These performance data typically comprise counters, event data, and other performance related data.

These network element data can be collected in databases 104 within each subsystem. In FIG. 1 the Management Subsystem DataBase 104 is thus one example only of such a database.

Each one of the different subsystems may be responsible for a certain technique specific part of the system, for example transport, radio, core-network, and service network.

The subsystem databases can be connected to a Central Management node, as indicated above. This is illustrated with the embodiment as presented in FIG. 2 in which, a Management Subsystem DataBase radio 202, a Management Subsystem DataBase transport 204, and a Management Subsystem DataBase 206, are connected to a Central Management Node 208.

Structure of Subsystem Databases

The data records in the subsystem databases are typically structured in segments to comprise the fields of four different types, although a different number of types of fields may be used. In FIG. 3 presenting an embodiment of a segmented database architecture 302, four different types of fields 304 are indicated as T, L, I and S, wherein the T field type denotes Time information, the L field type denotes Location information, the I field type denotes Flow/connection/user/service identity information, and the S field type denotes Statistics.

Examples of the time information (T) field type comprise start times, end times, durations, and milestone timestamps, relevant to any events.

Examples of the location information (L) field type comprise cell ID, Radio Network Controller (RNC) Id, and router addresses.

Examples of information related to flow/connection/user/service identity (I) may comprise User equipment (UE) address, International Mobile Station Equipment Identity (IMEI), port numbers and service name.

Byte, loss, jitter, delay, and retransmission values are examples of information that may be comprised in the statistics (S) field type.

The meaning of information may depend on the type of database. The same piece of information in two different databases may thus have two different meanings. For instance, a service node may report a start time of a service as time information, while an RNC node may report a channel event time as time information.

Description of Method Steps of Flow-Charts

Figure 4:
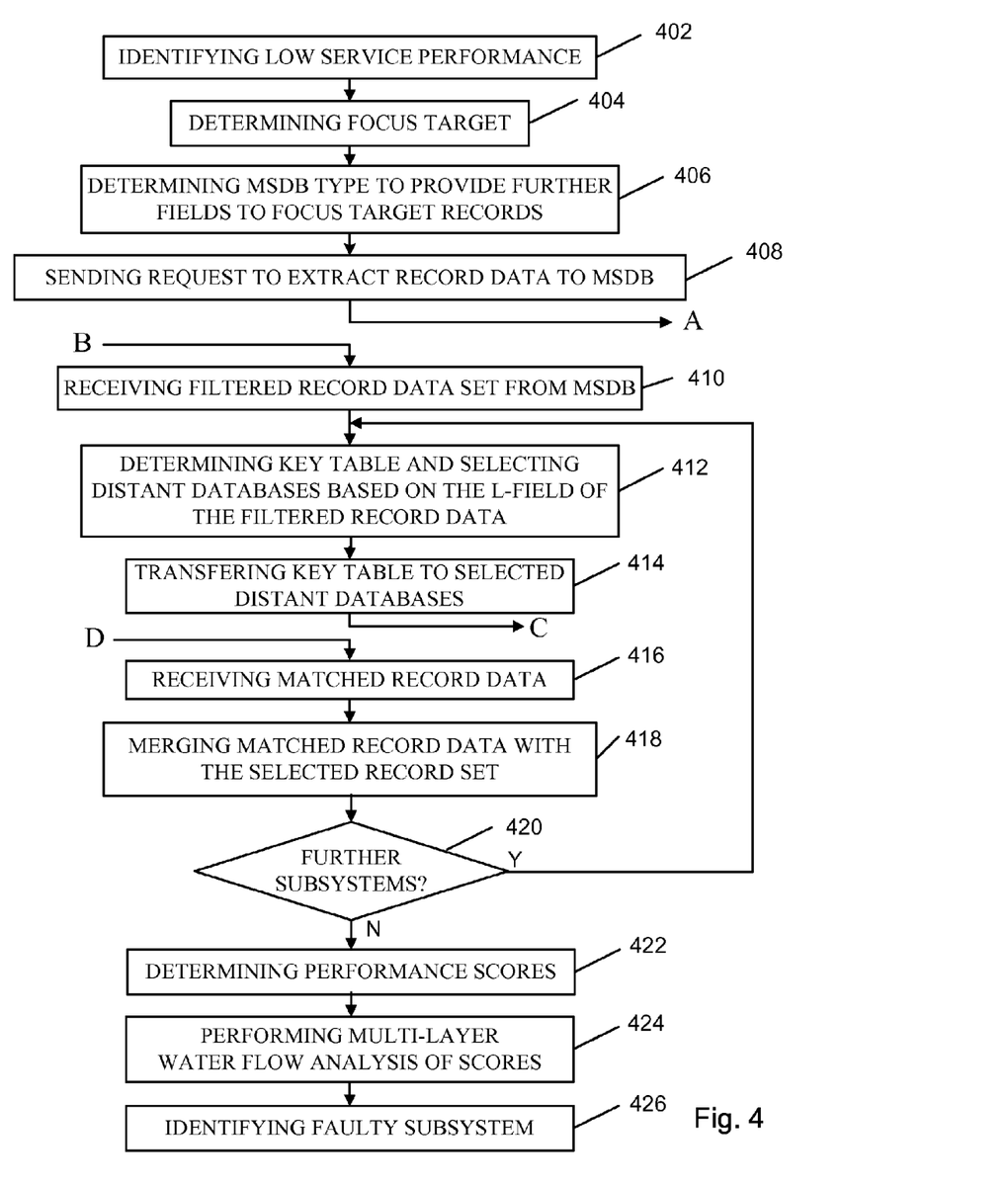
FIGS. 4, 5 and 6 are flow-charts illustrating embodiments of method steps.
Figure 5:
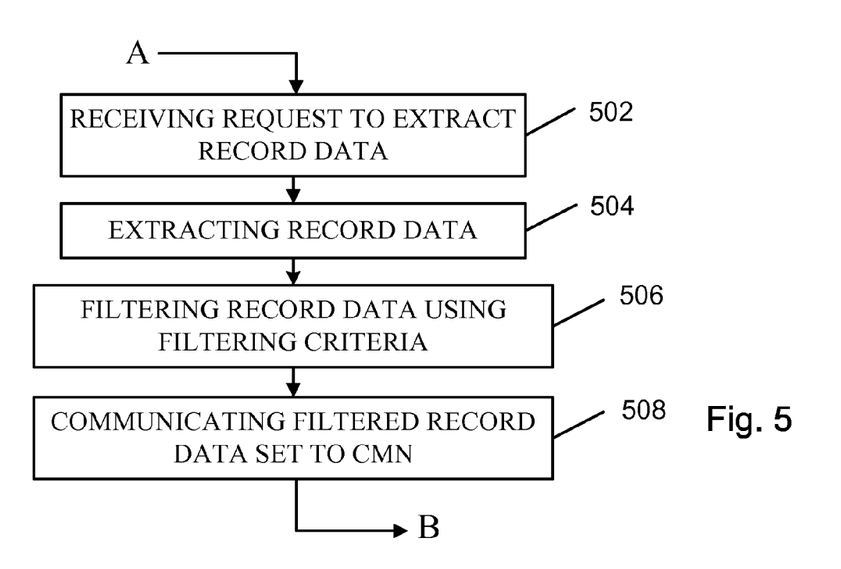
Figure 6:
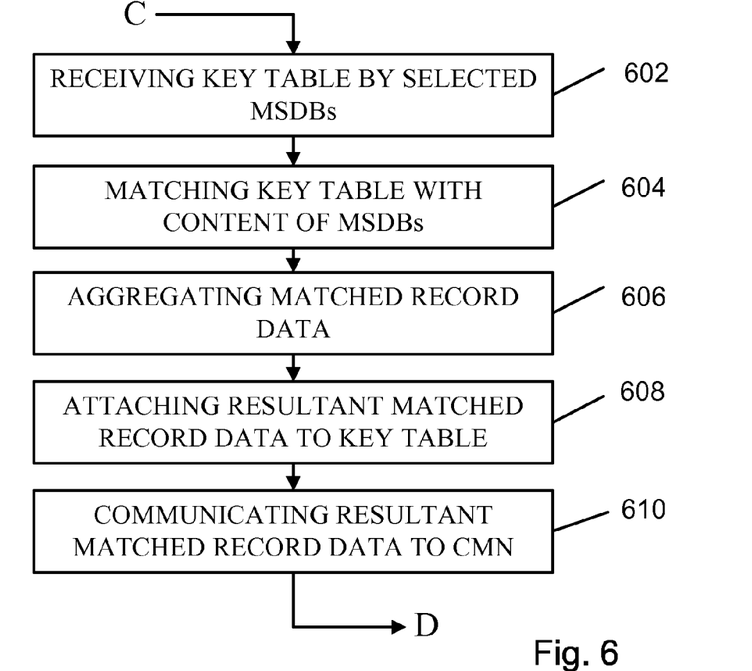

In order to describe methods for progressive correlation enabling localization of network faults according to some embodiments, reference is made to the flow-charts of FIGS. 4, 5 and 6. FIG. 4 presents a flow-chart of Central Management Node 208, whereas FIGS. 5 and 6 present flow-charts of Management Subsystem DataBases 104; 202, 204, 206.

The localization process can start with the method of processing record data as illustrated in FIG. 4. This method may start with the step of identifying a service performance, which is low or in any other way does not meet the requirements as agreed for the service, in step 402. It is noted that the step of identifying a service performance is one example of obtaining information related to a service related network fault event.

This step can be performed by the Central Management Node (CMN) 208 but may as well also be performed by each Management Subsystem DataBase 202, 204, 206, based on data obtained from network elements 102.

Having obtained the service performance information, the step of determining a focus target record may then be performed in step 404. This step is typically performed by the CMN.

For example, the CMN may determine the circumstances of a certain service that is reporting bad performance. This circumstance information can be called a focus target, for instance "bad performing mobile TV service flows in the last hour".

Since service performance may be of important for the operators, the focus target is usually the performance of a certain service, for instance Multi-media Telephony (MMTel).

The CMN typically determines the type of Management Subsystem DataBases to provide further information and fields to the focus target record, based on the focus target, step 406. A MSDB of the determined type may then be selected.

In order to collect further information, the CMN sends a request to the selected MSDB to extract record data related to the focus target record, step 408.

The method of processing record data, of FIG. 4 may now be continued by the method of providing a data record set, as illustrated in the flow-chart in FIG. 5.

As a response to the request sent by the CMN, said request is received by a MSDB for providing a data record set, in step 502.

At the MSDB that received the request in step 502, record data is extracted based on the focus target record, creating a record data set. The extracted record data may comprise performance information in the form of ports, alarms, and/or counters, which may have some relation to this focus target across the entire network in a progressive manner.

The record data set may comprise at least one key type, but may typically comprise four or possibly more data fields of different key types.

The four different field types may be the T, L, I and S types, wherein the T field type denotes Time information, the L field type denotes Location information, the I field type denotes Flow/connection/user/service identity information, and the S field type denotes Statistics, as described above. These field types are illustrated in the segmented database 704 of FIG. 7.

Thus, based on the focus target, record data is extracted. For example, if the focus target is "mobile TV performance", then the record data may comprise mobile "TV service flow" records comprising basic information about a set of individual service instances. The record data may be extracted from one of the Management Subsystem DataBases, in this example it may be extracted from an "Application Database", which comprises, among others, "service flow records" of Mobile TV traffic.

According to some embodiments relations between data in various databases, which typically are provided by network elements 102, may be identified. Moreover, each database may be assigned to report on problems or events related to specific techniques or special focus targets.

However, the Application database may comprise many more data records than necessary for the method steps as described herein. The record data set may therefore be selected from the Application database based on a certain criteria, say criteria F( ).

Figure 7:
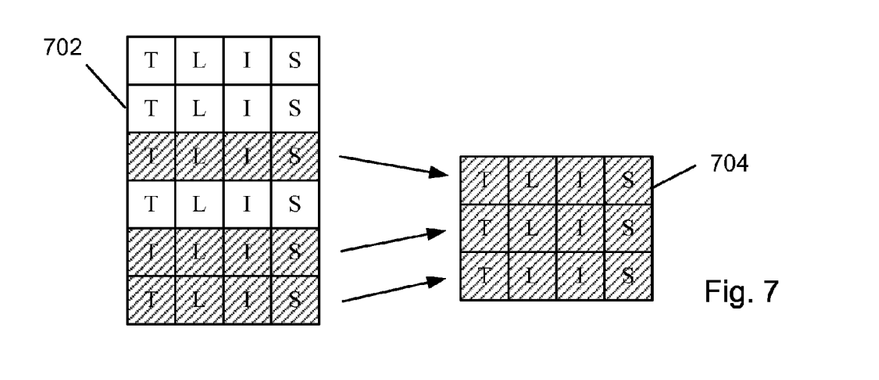
FIG. 7 schematically illustrates record data filtering of a database.

FIG. 7 illustrates filtering of data record 702 creating filtered record data 704.

The criteria F can be checked against any field types of the record data set extracted from the selected MSDB based on the focus target record, for instance a certain application server (L type), or a certain performance problem (S type). The process of checking using the criteria is typically applied a limited time only.

Within the method of providing record data of FIG. 5, filtering is performed in the step 506, filtering record data set using filtering criteria.

In order to limit the amount of record data to be processed, statistically significant sampling may also be performed.

In short, the criteria may check within the field types that the time is within a certain period, that the location information either does not represented a location limitation or that an analysis scope is limited to some location-type for example an application server.

The criteria may also perform filtering based on identities, identifying that certain subscriber groups have experienced problems. Statistics criteria to limit the scope to bad performing service flows, may also be used. Finally, sampling may be used to limit the record data set to a manageable size, for instance 10,000 data records.

Having obtained a filtered record data set in step 506, said record data set is communicated to the CMN in step 508.

This step typically ends the method of providing record data following the flow-chart of FIG. 5.

The method of processing record data is however continued by step 410 in FIG. 4, receiving filtered a record data set from the selected MSDB, from FIG. 5.

This record data set as obtained may comprise at least one key type, but may alternatively comprise at least four different data field types.

Having obtained a record data set comprising at least one key type in step 410, the CMN selects at least one peripheral Management Subsystem DataBase (MSDB) based on the obtained record data set, in step 412. One example of peripheral databases are database that are distant in relation to the Central Management Node (CMN).

Which MSDB to select may be based on the Location field (L type) of the record data set as obtained in step 410, according to one embodiment. The determination which database to select, and to further query information down below, may in addition to the Location field (L type), also be based on the Identity field (I type) of the record data set, according to another embodiment.

In the step of selecting MSDBs, step 412, the contents of the record data set is considered. Information about the architecture of the system in question may be available, which information may be used to decide which further databases to contact. This information may thus also be used for the determination of the relevant key types to query each database. For example, if table the record data set comprises user and server addresses, the step may look for network path performance information about the interconnecting transport between user and server. It may therefore select transport databases to query and use server IP addresses and user IP addresses and ports, as keys to build up a key set.

As will be mentioned down below his a progressive search in the subsystem databases may thus be performed and in-between the database queries, it processes previously received information in order to find the necessary keys to progress with the queries to the selected peripheral MSDBs.

According to some embodiments of the present invention, the record data set comprises a table, having at least one column for each field type. The field types define which columns should be selected from the record data set as keys in the key set. One example of a key set may be {time, server address, user address}.

A key set of keys of different field types may thus be obtained.

Based on this obtained key set that is based on the record data set, a key table can be determined in the CMN, wherein the key table comprises at least one key type, may in addition be performed in step 412.

Figure 8:
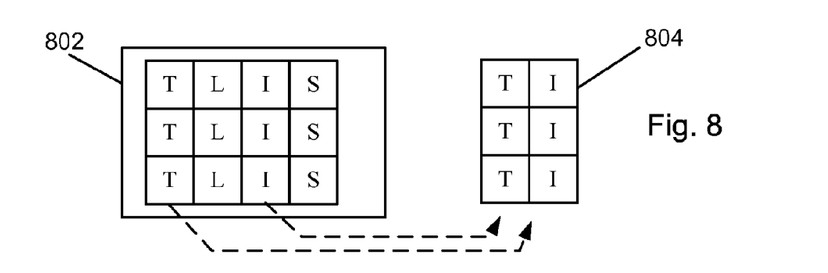
FIG. 8 schematically illustrates key extraction.

FIG. 8 schematically illustrates the determination of a key table 804 from a record data set 802, based on a key set (not shown).

During the key table determination process the keys may be selected from the record data set based on the obtained key set. For example, in case the selected MSDB is a streaming flow database, the key table can include streaming start, duration, address and port information. The key table determination process may thus be service dependent.

The resulting refined key table may be a column-filtered version the record data set. The record data set may in itself comprise a row-filtered version of the record data set as obtained from a selected MSDB, as mentioned above.

It is advantageous to extract a key table from the record data set based on the key types, as the key table may be much smaller in size and can be more efficiently provided or transferred to the MSDBs for processing. This is possible since only the necessary information may be transferred.

Having determined the key table, it is transferred from the CMN to the selected peripheral MSDBs D1, . . . , Dn, 202, 204, 206, in step 414.

Prior to the transfer, the key table may moreover be compressed to further reduce its size.

Also, in case there is information in the Location or Identity fields of the key table, the entire key table may not have been transmitted to all potentially distant or peripheral databases, but rather a subset of them all. Such information may however not always be available.

The method of processing record data following flow-chart in FIG. 4 may now be continued by the method of matching record data set following the flow-chart as presented in FIG. 6.

Accordingly, in step 602, each of the MSDBs to which a key table was transferred in step 414, now received said key table information.

The following step is the step of matching the at least one key type of the key table with the content of the peripheral MSDBs, being database record sets, in step 604.

Figure 9:
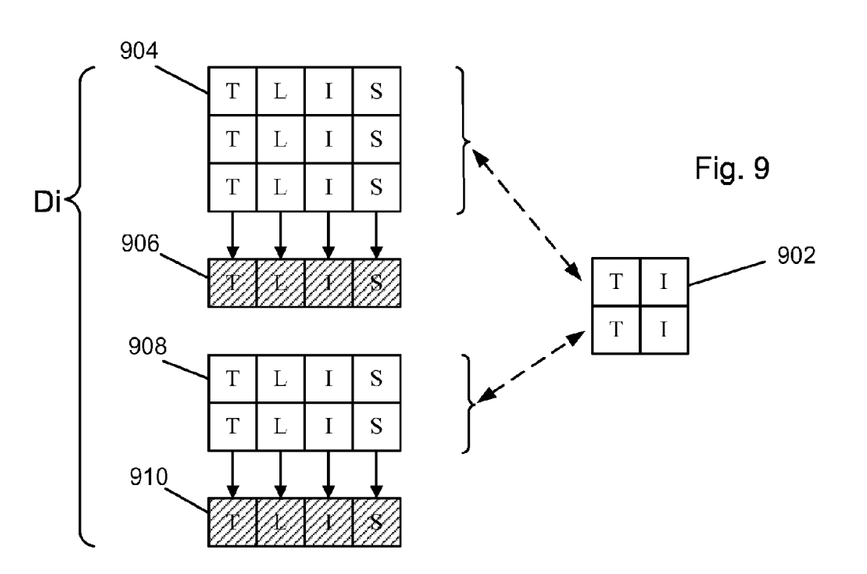
FIG. 9 illustrates matching and aggregation of record data.

FIG. 9 illustrates matching of the key table 902 and the content of a peripheral MSDB, resulting in two record data sets, 904 and 908.

In a peripheral or distant MSDB, on receiving the key table, a matching process may thus be invoked. This process may identify all local records that match the key table. It should be mentioned that the matching does not always require an exact equality, but rather that the matching may be controlled by any matching function.

The at least one key type of the key table may comprise information associated with the service of one of the following types: time information, location information, identity information and statistics information.

The database record set may further comprise at least four data field types in the step of matching the at least one key type with the database record set.

The service related network fault event underlying the method for matching record data may relate to a first layer of a network protocol, and whereas the merged matched data record set may comprises information at least related to a second layer of a network protocol.

This matching function may depend on the type of information stored in the distant database and the key table. For example, in case the key table comprises service flow information, comprising start time, duration and IMSI, while the distant database comprises RNC throughput statistics with 2 sec resolution, the matching function will match all throughput records timed between the start and the start+duration. As a result, the matching records are often more in number than the key table.

The subsequent step in the flow-chart of FIG. 6, may be the step of aggregating matched record data, step 606, as schematically illustrated in FIG. 9, wherein two record data sets 904 and 908 are aggregated into record sets 906 and 910, respectively.

Multiple resultant record data belonging to a certain key may thus be aggregated to single record data. For example, some throughput records may be averaged for the duration of a streaming flow. In the resultant aggregated record data field types may be changed.

The aggregated resultant record data may then be attached to the key table providing expanded record data with more table entries, in step 608. The new fields of the aggregated resultant record data can via this attachment be associated with the MSDB from which the record data set was created.

Having attached the matched record data to the key table, in step 608, the resultant matched record data comprising the key table is communicated to the CMN in step 610.

The method for matching record data ends here, whereas the method for processing record data following the flow-chart as presented in FIG. 4, is continued in step 416, receiving matched record data.

The received resultant matched record data can now be associated with the record data set from which the key table originates, in the step of merging record data with the selected record set, step 418.

The matched record data for merging may comprise four data field types and the obtained record data set for merging may comprise at least at least four data field types such that the step of merging, step 418 can comprise merging matched record data comprising at least four data field types with the obtained data record set comprising at least four data field types.

The service related network fault event underlying the method may relate to a first network protocol layer, and whereas the merged matched data record set may comprises information at least related to a second network protocol layer.

According to at least some embodiments the first network protocol layer is a first layer of a network protocol, where the second network protocol layer is a second layer of a network protocol.

Figure 10:
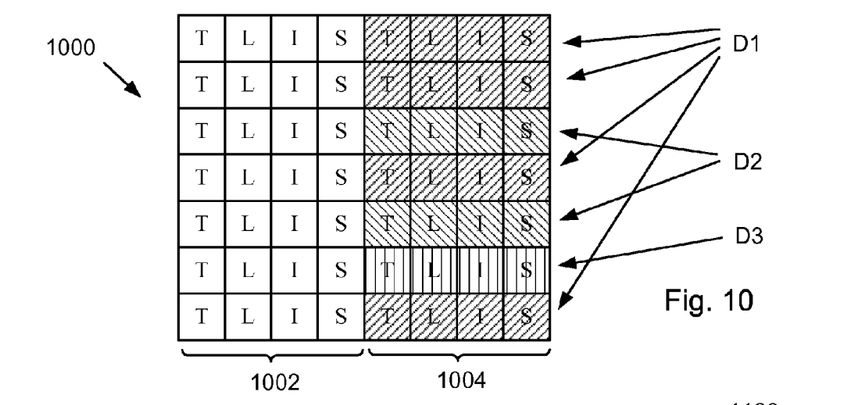
FIG. 10 illustrates merging of record data to record table.

In FIG. 10 on example of a merged matched record data set 1000 is illustrated, wherein the set comprises the record data set 1002 from which the key table originates, and the matched record data set 1004 that results from different MSDBs D1, D2 and D3.

In the following step, step 420 it is determined by the CMN whether or not there is at least one additional subsystem for which information may be received from additional MSDBs. In case it is determined that there is at least one additional subsystem, the flow-chart continues with step 412, determining a key table comprising at least one key type based on the obtained record data set and selecting at least one additional distant or peripheral subsystem database.

Accordingly, steps 412 to 418 of the method for processing record data, as well as steps 602-610 of the method for matching record data may thus be performed at least one more time, providing additional resultant record data.

In the case it is determined in step 420, that there are no further subsystems to analyze, the method of the flow-chart in FIG. 4 continues.

The resultant merged data may be stitched with the merged data from other subsystems.

Figure 11:
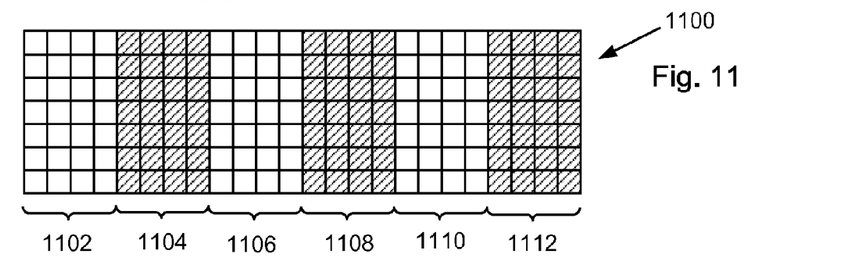
FIG. 11 illustrates one embodiment of stitched merged record data from various subsystems.

FIG. 11 illustrates one embodiment of stitched merged record data 1100 from various subsystems, wherein the subsystems of records 1102-1112 may be the streaming server subsystem, the IP transport subsystem, the 3G core network subsystem, the UTRAN subsystem, the Radio subsystem, the cell counters subsystem and the UE reports subsystem, respectively.

When all distant MSDBs, as determined in step 412 have been searched in the above-described progressive manner, the resultant stitched table may comprise data preprocessed in a manner that may be relevant for the specific original focus target set.

Having obtained a stitched data table 1100 the subsequent step may be the step of determining performance scores, step 422.

Based on the resultant stitched table, end-to-end service performance indicators as one example of performance scores may be determined according to some embodiments of the present invention.

Figure 12:
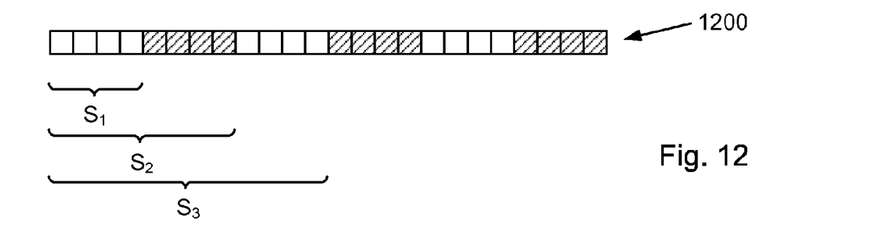
FIG. 12 illustrates one row of merged data records with indicated subsystem performance scores.

FIG. 12 illustrates one row for one service instance of a merged record data 1200 with indicated subsystem performance scores, $S_1$, $S_2$ and $S_3$.

These end-to-end service performance indicators may cover the end-to-end treatment of services in an improved manner by applying a rule-based algorithm that processes the resultant output table.

A performance score specific to each service instance in the database may thus be determined. The indicators may be determined based on a service performance model that takes into account the resultant output table. A performance score for each resultant data record representing a service instance of the record data set, may thus be provided.

The service performance model may define thresholds and/or weights for each pertinent subsystem correlated input, depending on the service under investigation.

The end-score may be a function of the per-subsystem weights or weights and may provide a score between 0-100 depending on the "goodness" of the service. This score may thus cover the entire end-to-end treatment of the service as a single number for each service instance of the record data set. The logic of the mapping between record data and scores may be service and system dependent.

In addition an overall average score may be calculated, which overall average of the individual end-scores may define an end-to-end so called Key Performance Indicator (KPI) for the given focus target of the record data set.

The subsequent step in the flow-chart in FIG. 4 may be the step of performing multi-layer water flow analysis of scores, step 424.

Said multi-layer water flow analysis may progressively benchmark the treatment of services by using predefined criteria and present the most likely contributor to performance problems given by the most significant drop in successive subsystem performance scores.

Figure 13:
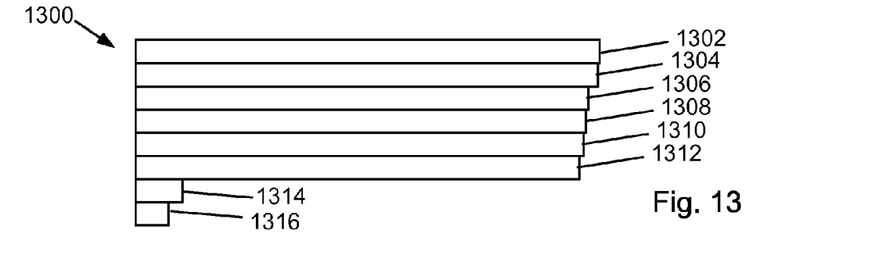
FIG. 13 illustrates a presentation of a water flow analysis of performance scores.

FIG. 13 illustrates a presentation 1300 of a water flow analysis of performance scores, wherein for example the various performance scores relating to the service may reflect successfully connected 1302, media startup OK 1304, first media packet within limit 1306, transport delay low 1308, transport jitter low 1310, transport loss low 1312, radio rate sufficient 1314 and radio rate variance low 1316.

In order to enable such a presentation, a special service model may be applied, where in contrast to the usage of a single end-to-end score, subsystem specific scores are calculated.

These scores may be calculated for the different merged sections of the resultant output records representing different sub-systems in a successive manner such that for example subsystem score 2 incorporates the combined performance score of both subsystem 1 and 2. Similarly subsystem score 3 likewise incorporates the combined subsystem performance of subsystems 1-3 and so on.

Due to this nested construct, the series of subsystem scores S will be a monotonously decreasing number, and the last value equals the end-to-end score. The largest score drop between consecutive sub-scores indicates which subsystem contributes the most to the end-to-end score, and thus clearly indicates a performance bottleneck of the system, being one example of step 426, identifying faulty subsystem, being the last step of the method as illustrated in the flow-chart of FIG. 4.

Returning to FIG. 13 it is directly seen from the water flow analysis that the bottleneck relates to score 1314, providing of a sufficient radio rate.

The CMN 208 may comprise means for performing the steps of said Node, that is means for obtaining information related to the service related network fault event, means for determining a focus target record, based on the information related to the service related network fault event, means for obtaining record data set, based on the focus target record, means for selecting at least one peripheral database and to determine a key table comprising at least one key type, based on the obtained record data set, means for obtaining matched record data based on the key table, from the selected at least one peripheral database, and means for merging matched record data with the obtained record data set.

The CMN 208 may also comprise means to determine which MSDB type to address a request to extract record data related to the focus target record.

One example of realizations of the CMN 208 may be a processor coupled to a database unit for storing record data.

Management Subsystem DataBases may comprise means for performing the steps of the method for providing a record data se, that is comprise means for obtaining events from network elements, for storing event records with sets of four data type fields, means for extracting record data related to a focus target record related to the network fault event, and means for communicating the extracted record data set.

In addition the MSDB may comprise means for filtering the extracted record data using filtering criteria.

Management Subsystem DataBases may moreover comprise means for performing the steps of the method for matching record data, that is comprise means for obtaining a key table comprising at least one key type related to a record data set, means for matching the at least one key type of the key table with a database record set, means for attaching matched record data to the key table, and means for communicating the key table and attached matched record data, such that record data information comprising the key table and the matched record data, is provided.

Further, the MSDB may comprise means enabling the database record set to comprise at least four data field types.

It should be mentioned that the MSDB for providing a record data set and the MSDB for matching record data are typically realized by different MSDBs. However, they may be realized by the same Management Subsystem DataBase (MSDB) having two or more functions, of which two are exemplified by the methods of flow-charts 5 and 6.

Example Embodiment of the Method for Mobile TV Analysis

The method steps according to the flow-chart can be applied to most kinds of communication networks, if not all.

The embodiments as outlined below apply to a 3G network.

In brief, the procedure of applying at least some of the method steps in a 3G network may be the following in order:
1) Starting trigger specifying the service in focus, as the focus target, MobileTV.
2) Selection of service flows to be investigated from the service domain database, as the selection of the database start set.
3) Correlation of service flows with transport domain database using time, IP address and ports as common keys to gain information about selected transport paths and transport performance.
4) Correlation of flows with 3G PDP database using time and IP address keys as common keys to gain information about the IMSI and APN for each service flow.

5) Correlation of flows with 3G radio database using time and IMSI as common keys in order to obtain information about the location of the user at the time of the service (RNC and cell) as well as radio performance related information.

Invoking Method Start—Starting Trigger

The method may be triggered in several ways: The method may be applied periodically, in the case continuous reporting of correlated performance is required.

System triggered method may be used when an alarm is raised in the network, or a Key Performance Indicator (KPI) has for example fallen below a preset value. If a problem is found, the results can be presented to the user.

Manually triggered initiation of the method can also be performed on-demand by the O&M user.

The trigger defines the service in focus for the investigation. In the example, the Mobile TV service is chosen.

Selection of MobileTV Service Flows for Analysis

In this step, a set of service flows is selected from the service domain database. The flow information typically contains start-end timestamps, IP, port addresses and further attributes for each service flow. The selection of flows may be a random subset (e.g., 1000 flows during the last 15 minutes) or filtered depending on some attribute (e.g., all flows accessing the Discovery channel between 10-11 AM). In this example, all Mobile TV session flows that were served by server "10.10.28.60" are selected.

The selected flows may be transferred to the central management node using an extension of the SQL language, referred to as SQL-transfer from now on. Each service flow may have several attributes that are related to the streaming signaling and streaming media.

Correlation of MobileTV Service Flows with Transport Domain

In the next step, the time, IP address and port number information of the selected service flows is matched with the transport flows monitored at the transport domain database. For this the keys: {start time, duration, IP addresses, port numbers} may be sent to the transport domain for correlation.

The transport domain, using these keys can then search for transport flows that match the keys and send back the transport records to the central node database. This way, the central management node will have exact information about the path, delay, loss and jitter for each mobile TV flow.

Correlation of Flows with 3G PDP Database

In this step, the streaming flow data may be sent to the 3G database in order to obtain PDP information for the flow. Within this example, this step is useful due to the fact that the 3G Universal Mobile Telecommunications System Terrestrial Radio Access Network (UTRAN) nodes have no IP layer information, which implies that instead of IP address, the IMSI number will have to be provided later on.

After correlating with the Packet Data Protocol (PDP) database, each service flow record may be extended with the PDP information fields including the IMSI, and Access Point Name (APN) name and PDP start time.

Correlation of Flows with 3G Radio Database

Once IMSI and APN are known, the system inquires the 3G domain database to add further information to the flow record by searching its database and selecting those records that match the flow information. The flow is appended with the following information:

RNC identity
Cell identity
Radio channel information (HS, DCH64, DCH128, DCH384)
Radio Link Control (RLC) rate average and variance in kbps
Counters like: RLC retransmissions, cell congestion, cell outage Using the Method to Find Mobile TV Streaming Problems The method may be used in numerous ways to find performance problems. One usage may be to calculate system-wide Key Performance Indicators (KPIs) that reflect the end-to-end treatment of the service. Such KPIs are superior to node counters or other system KPIs in reflecting the end-user performance. For example, the streaming rate guarantee KPI takes into consideration the relation between the SDP committed rate with the measured actual rate on the Gn, considering the loss across the transport and the radio scheduled bit rate.

It is obvious, that further information sources can easily be added to the method. For example, in the case the terminal reports buffer overflow or Mean Opinion Score (MOS) value, such statistics can easily be added to the method. The system thus offers great flexibility for customization and improvements.

Streaming media integrity should reflect the media quality along the path between the media server and the mobile client. Streaming media successfully reaches the end user at a guaranteed quality, if all the below criteria met, all data available after method. In this case the performance score is defined to be 100% if:

Real Time Streaming Protocol (RTSP) start to first media packet delay is below a defined limit Real Time Control Protocol (RTCP) reported delay, loss and jitter is below a defined limit RTCP Extended Report (XR) reported media quality is good Average streaming RNC RLC scheduled downlink rate is not less than the measured actual transport rate including RLC overhead RNC RLC rate variation is limited, that is below a threshold User Equipment (UE) performs no down-switches during media transfer Cell is not reported as being congested Transport connecting server to the RNC has good network delay, jitter and loss Above a fairly detailed example applied to Mobile TV was described.

It should be understood that the presented embodiments of the present invention are only a few examples of the variety of embodiments that are comprised within the present invention.

It is noted that the elements of the dependent claims are optional.

It is pointed out that the corresponding embodiments of the dependent claims of the method of processing record data, that is claims 2-12, are also applicable to other sets of claims, such as for claim 13 of the Central Management Node, with appropriate amendments.

It is emphasized that the embodiments within the present invention can be varied in many ways, of which the alternative embodiments as presented are just a few examples. These different embodiments are hence non-limiting examples. The scope of the present invention, however, is only limited by the subsequently following claims.

It is thus easy to understand that at least some embodiments of the present invention come with a number of advantages of which a few are:

A valid end-to-end performance survey may be provided to the operator, comprising information with which quality the services may reach the end-users.

Previously hidden problems that did not trigger an alarm may now be detected.

Faster localization of faults may is enabled, in the case the dependences are complex.

The application of self-tuning methods is enabled due to presentation of service and network attributes related to problematic flows, in addition to the presentation of fault localization Although the processing according to some embodiments is based on detailed event records, due to the progressive method, the amount of management traffic should be manageable by adjusting the size of the key table. The inherently exponential complexity of a search may here be reduced to linear complexity.

The invention claimed is:

1. A computer implemented method, using a Central Management Node, for enabling localization of a network fault associated with a service, said method comprising the steps of:
  obtaining information related to a service associated network fault event;
  determining a service related record based on the obtained information;
  extracting, using a processor, a record data set for the service related record from a subsystem database, the record data comprising at least one type of information associated with the service, among the types: time information, location information, identity information and statistics information;
  determining, using the processor, a key table comprising at least one type of information associated with the service, among the types: time information, location information, identity information and statistics information, based on the extracted record data set;
  matching, using the processor, the at least one type of information associated with the service, among the types: time information, location information, identity information and statistics information of the key table with a subsystem database record set, wherein the matching comprises finding key table records that match to subsystem database records;
  attaching matched record data to the key table,
  merging the key table with attached matched record data with the extracted record data set;
  determining a service performance indicator, based on the obtained merged matched record data set, wherein determining the service performance indicator comprises determining a subsystem specific performance related end-score associated with the service related network fault event; and
  performing a multi-layer water flow analysis of subsystem specific performance related indicators, wherein the analysis obtains localization information of the network fault, wherein a data record information set comprising the matched database records and the extracted at least one record data set is obtained.

2. The method according to claim 1, wherein the step of extracting a record data set comprises extracting a record data set comprising at least four data field types, and wherein the step of merging comprises merging the key table with attached matched record data comprising at least four data field types with the extracted data record set comprising at least four data field types.

3. The method according to claim 1, wherein the step of extracting record data further comprises filtering record data using filtering criteria.

4. The method according to claim 1, wherein the service related network fault event at least relates to a first network protocol layer, and wherein the merged matched data record set comprises information at least related to a second network protocol layer.

5. The method according to claim 4, wherein the first network protocol layer comprises a first layer of a network protocol and the second network protocol layer comprises a second layer of a network protocol.

6. The method according to claim 1, further comprising the step of determining whether there is at least one additional subsystem, and selecting at least one additional peripheral subsystem
  database and determining a key table comprising at least one type of information associated with the service, among the types: time information, location information, identity information and statistics information, based on the extracted record data set, in dependence of the determination whether there is at least one additional subsystem.

7. A Network Fault Management System for providing at least a data record information set for enabling localization of a network fault associated with a service, the system comprising:
  a processor;
  a Central Management Node (CMN) coupled to the processor that processes record data that enables localization of a network fault associated with a service, the CMN comprising means for obtaining information related to the service related network fault event, and means for determining a service related record, based on the obtained information;
  a Management Subsystem Database that provides a record data set that enables localization of a network fault associated with a service, said database comprising means for;
  obtaining events from network elements;
  storing event records with sets of four data type fields;
  extracting a record data set for the service related record related to the network fault event, wherein the data record comprises at least one type of information associated with the service, among the types: time information, location information, identity information and statistics information;
  wherein the Central Management Node further comprises means for determining a key table comprising at least one type of information associated with the service, among the types: time information, location information, identity information and statistics information, based on the extracted record data set; and
  at least one Management Subsystem Database that matches record data that enables localization of a network fault associated with a service, said database comprising means for matching the at least one type of information associated with the service, among the types: time information, location information, identity information and statistics information of the key table with a record set of the Management Subsystem Database, wherein the matching comprises finding the key records that match records of the Management Subsystem Database;
  means for attaching matched record data to the key table, wherein the Central Management Node further comprises:
  means for merging the key table with attached matched record data with the extracted record data set;
  means for determining a service performance indicator based on the obtained merged matched record data set, wherein the means for determining the service performance indicator comprises means for determining a subsystem specific performance related end-score associated with the service related network fault event; and means for performing a multi-layer water flow analysis of subsystem specific performance related indicators, wherein the analysis obtains localization information of the network fault, wherein a data record information set comprising the matched database records and the extracted at least one record data set is obtained.

8. The Network Fault Management System according to claim 7, wherein the Management Subsystem Database for providing a record data set, further comprises means for filtering the extracted record data using filtering criteria.

9. The Network Fault Management System according to claim 7, wherein the database record set within the Management Subsystem Database for matching record data, comprises at least four field types.

* * * * *

UNITED STATES PATENT AND TRADEMARK OFFICE
CERTIFICATE OF CORRECTION

| | | |
|---|---|---|
| PATENT NO. | : 8,370,369 B2 | |
| APPLICATION NO. | : 12/988739 | |
| DATED | : February 5, 2013 | |
| INVENTOR(S) | : Veres et al. | |

It is certified that error appears in the above-identified patent and that said Letters Patent is hereby corrected as shown below:

In the Claims:

In Column 16, Line 34, in claim 7, delete "for;" and inset -- for: --, therefor.

Signed and Sealed this
Fourteenth Day of May, 2013

Teresa Stanek Rea
*Acting Director of the United States Patent and Trademark Office*